United States Patent
Nakashima et al.

(10) Patent No.: US 9,798,950 B2
(45) Date of Patent: Oct. 24, 2017

(54) FEATURE AMOUNT GENERATION DEVICE, FEATURE AMOUNT GENERATION METHOD, AND NON-TRANSITORY MEDIUM SAVING PROGRAM

(71) Applicant: OLYMPUS CORPORATION, Tokyo (JP)

(72) Inventors: Aya Nakashima, Tokyo (JP); Atsushi Kohashi, Tokyo (JP); Yasuko Sonoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 89 days.

(21) Appl. No.: 14/795,510

(22) Filed: Jul. 9, 2015

(65) Prior Publication Data

US 2017/0011277 A1 Jan. 12, 2017

(51) Int. Cl.
*G06K 9/46* (2006.01)
*G06T 3/40* (2006.01)
*G06T 3/60* (2006.01)

(52) U.S. Cl.
CPC ......... *G06K 9/4671* (2013.01); *G06K 9/4642* (2013.01); *G06T 3/4007* (2013.01); *G06T 3/4069* (2013.01); *G06T 3/60* (2013.01)

(58) Field of Classification Search
None
See application file for complete search history.

(56) References Cited

U.S. PATENT DOCUMENTS

| 6,711,293 | B1 * | 3/2004 | Lowe ................... | G06K 9/4671 |
| | | | | 382/219 |
| 8,232,092 | B2 * | 7/2012 | Ho ....................... | C12Q 1/6813 |
| | | | | 422/82.05 |
| 8,737,737 | B1 * | 5/2014 | Feldman .............. | G06K 9/4642 |
| | | | | 382/168 |

(Continued)

FOREIGN PATENT DOCUMENTS

| JP | 2010-55195 A | 3/2010 |
| JP | 2010-86138 A | 4/2010 |

OTHER PUBLICATIONS

Office Action dated Jun. 6, 2017, issued in counterpart Japanese Application No. 2013-165512, with English translation (6 pages).

*Primary Examiner* — Iman K Kholdebarin
(74) *Attorney, Agent, or Firm* — Westerman, Hattori, Daniels & Adrian, LLP (57) ABSTRACT

A feature amount generation device includes a feature point detecting unit which detects a feature point from an input image, a pixel information generating unit which generates pixel information from pixel values of the surroundings of the feature point in the input image, a feature point pixel information distribution generating unit which generates a first distribution of pixel information of a first region including the feature point, a sub-feature point detecting unit which detects sub-feature points that are feature points in the surroundings of the feature point, a sub-feature point pixel information distribution generating unit which generates second distributions of pixel information of second regions including the sub-feature points, and a feature amount generating unit which generates a feature amount at the feature point based on the first distribution and the second distributions.

13 Claims, 8 Drawing Sheets

(56) References Cited

U.S. PATENT DOCUMENTS

| | | | | |
|---|---|---|---|---|
| 8,885,945 B2* | 11/2014 | Bryll | ........................ | G06K 9/50 |
| | | | | 382/199 |
| 2008/0234144 A1* | 9/2008 | Ho | ........................ | C12Q 1/6813 |
| | | | | 506/39 |
| 2014/0185910 A1* | 7/2014 | Bryll | ........................ | G06K 9/50 |
| | | | | 382/141 |
| 2016/0335475 A1* | 11/2016 | Krenzer | ............. | G06K 9/00335 |
| 2017/0032214 A1* | 2/2017 | Krenzer | ............. | G06K 9/00335 |

* cited by examiner

FEATURE AMOUNT GENERATION DEVICE, FEATURE AMOUNT GENERATION METHOD, AND NON-TRANSITORY MEDIUM SAVING PROGRAM

BACKGROUND OF THE INVENTION

Field of the Invention

The present invention relates to technology for generating the feature amount of a feature point of an image.

Description of Related Art

In general, a feature point on an image is a point having a unique pixel structure for which a correspondence can be easily found. For example, an angle or an intersection of lines is a feature point. Tracking of a moving body using matching information between feature points of a plurality of images, estimation of a camera position, stereo vision technology, and the like are being widely used. Also, a feature amount is a unique value of each feature point and is used for calculation of the degree of similarity between feature points at the time of matching or for image recognition.

As a feature amount calculation method, a method referred to as scale invariant feature transformation (SIFT) is disclosed in the specification of U.S. Pat. No. 6,711,293. This is a method of making a feature amount of a 128-dimensional vector which represents a distribution of the luminance gradient vectors of pixels in a fixed region of the surroundings of a feature point. The feature amount calculated by this method is strong against rotation of an image and changes in scale and illumination.

In the related method, a feature amount is generated from pixel information of a fixed rectangular region close to a feature point at all times. For this reason, the generated feature amount is weak against movement of a subject, and when a pixel structure in the rectangular region changes, the feature amount of the same feature point greatly changes. In estimation of a camera position or tracking of a moving body, movement of a subject or a change of a viewpoint frequently occurs. For this reason, in the related method, there is a chance of identical feature points of the same subject in a plurality of images not being considered to be the same point due to a slight change of a nearby structure such as a background, and the matching accuracy is degraded.

SUMMARY OF THE INVENTION

According to a first aspect of the present invention, a feature amount generation device includes: a feature point detecting unit which detects a feature point from an input image: a pixel information generating unit which generates pixel information from pixel values of surroundings of the feature point in the input image: a feature point pixel information distribution generating unit which generates a first distribution of pixel information of a first region including the feature point: a sub-feature point detecting unit which detects sub-feature points that are feature points in the surroundings of the feature point; a sub-feature point pixel information distribution generating unit which generates second distributions of pixel information of second regions including the sub-feature points, and a feature amount generating unit which generates a feature amount at the feature point based on the first distribution and the second distributions.

According to a second aspect of the present invention, in the feature amount generation device related to the first aspect, the sub-feature point pixel information distribution generating unit may determine a number of partitions of the second regions according to a number of the sub-feature points detected by the sub-feature point detecting unit, partition the second regions so that a number of regions after the partition becomes the determined number of partitions, and generate a second distribution for every region after the partition.

According to a third aspect of the present invention, in the feature amount generation device related to the first aspect, the sub-feature point pixel information distribution generating unit may determine a partition size of the second regions according to a number of the sub-feature points detected by the sub-feature point detecting unit, partition the second regions so that a size of regions after the partition becomes the determined partition size, and generate a second distribution for every region after the partition.

According to a fourth aspect of the present invention, in the feature amount generation device related to the first aspect, the sub-feature point pixel information distribution generating unit may set points of which feature evaluation values are lower than a feature evaluation value of tire feature point detected by the feature point detecting unit as candidates for the sub-feature points.

According to a fifth aspect of the present invention, in the feature amount generation device related to the fourth aspect, the sub-feature point detecting unit may determine one point or a plurality of points of which feature evaluation values are higher than a predetermined value among the candidates for the sub-feature points as the sub-feature points.

According to a sixth aspect of the present invention, in the feature amount generation device related to the first aspect, the feature amount generating unit may set, as a feature amount at the feature point, a set in which the first distribution and a distribution obtained by arranging the second distributions related to the respective plurality of sub-feature points in order based on feature evaluation values of the respective plurality of sub-feature points are combined.

According to a seventh aspect of the present invention, in the feature amount generation device related to the first aspect, the pixel information generating unit may generate gradient vectors including angles and lengths of gradients of the pixel values of the surroundings of the feature point in the input image as the pixel information.

According to an eighth aspect of the present invention, in the feature amount generation device related to the seventh aspect, the sub-feature point pixel information distribution generating unit may generate histograms showing distributions of cumulative totals of lengths with respect to angles as the second distributions by regarding gradient vectors of pixels of the second regions among the gradient vectors generated by the pixel information generating unit as elements.

According to a ninth aspect of the present invention, in the feature amount generality device related to the eighth aspect, the feature point pixel information distribution generating unit may generate a histogram showing a distribution of cumulative totals of lengths with respect to angles as the first distribution by regarding gradient vectors of pixels of the first region among the gradient vectors generated by the pixel information generating unit as elements.

According to a tenth aspect of the present invention, in the feature amount generation device related to the first aspect, the pixel information generating unit may generate the pixel information using at least one of luminance values and color information of the input image as the pixel values.

According to an eleventh aspect of the present invention, in the feature amount generation device related to the first aspect, the pixel information generating unit may generate the pixel information using a raw image as the input image.

According to a twelfth aspect of the present invention, the feature amount generation device related to the first aspect may further include a main direction adjusting unit which calculates a main direction of the feature point based on gradient angles of the pixel values of pixels in the surroundings of the feature point in the input image and rotates the input image according to the main direction, and the pixel information generating unit may generate pixel information from pixel values of surroundings of the feature point in the input image rotated by the main direction adjusting unit.

According to a thirteenth aspect of the present invention, a feature amount generation method includes: a step of detecting a feature point from an input image; a step of generating pixel information from pixel values of surroundings of the feature point in the input image; a step of generating a first distribution of pixel information of a first region including the feature point; a step of detecting sub-feature points from the surroundings of the feature point; a step of generating second distributions of pixel information of second regions including the sub-feature points; and a step of generating a feature amount of the feature point based on the first distribution and the second distributions.

According to a fourteenth aspect of the present invention, a non-transitory medium saving a program for causing a computer to perform: a step of detecting a feature point from an input image; a step of generating pixel information from pixel values of surroundings of the feature point in the input image; a step of generating a first distribution of pixel information of a first region including the feature point, a step of detecting sub-feature points from the surroundings of the feature point; a step of generating second distributions of pixel information of second regions including the sub-feature points; and a step of generating a feature amount of the feature point based on the first distribution and the second distributions.

DETAILED DESCRIPTION OF THE INVENTION

Hereinafter, embodiments of the present invention will be described with reference to drawings.

(First Embodiment)

Figure 1:
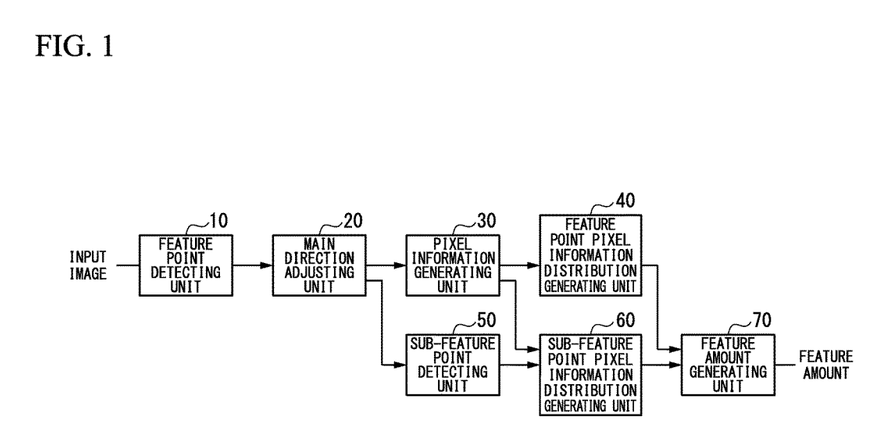
FIG. 1 is a block diagram showing a configuration of a feature amount generation device according to a first embodiment of the present invention.

First, a first embodiment of the present invention will be described. FIG. 1 shows a configuration of a feature amount generation device according to this embodiment. The feature amount generation device shown in FIG. 1 includes a feature point detecting unit 10, a main direction adjusting unit 20, a pixel information generating unit 30, a feature point pixel information distribution generating unit 40, a sub-feature point detecting unit 50, a sub-feature point pixel information distribution generating unit 60, and a feature amount generating unit 70.

Function of the respective blocks will be described below. An input image which is a target for processing of generating a feature amount is input to the feature amount generation device from the outside, and temporarily stored in a memory included in the device, which is not shown in the drawing.

The feature point detecting unit 10 detects a feature point form the input image. Most specifically, the feature point detecting unit 10 calculates feature evaluation values representing the strengths of a corner and an edge using the input image, detects a point of which a calculated feature evaluation value is high as a feature point and outputs the coordinates of the detected feature point (referred to as feature point coordinates below).

The main direction adjusting unit 20 calculates a main direction of the feature point based on the gradient angles of the pixel values in the surrounding of the feature point in the input image, and rotates the input image according to the main direction to generate a rotated image. More specifically, the main direction adjusting unit 20 calculates the gradient angles of the pixel values close to the feature point coordinates detected by the feature point detecting unit 10 and detects the most common angle amount the calculated angles as the main direction. In addition, the main direction adjusting unit 20 cuts a region of a predetermined size centering on the feature point coordinates off from the input image and rotates the image of the cut-off region according to the angle of the detected main direction, thereby generating a rotated image. The cut-off region is set as a region including data which is used when the feature point pixel information distribution generating unit 40 and the sub-feature point pixel information distribution generating unit 60 at rear stages generate distributions of pixel information.

The pixel information generating unit 30 generates pixel information from pixel values of the surroundings of the feature point in the rotated image generated by the main direction adjusting unit 20. More specifically, the pixel information generating unit 30 generates gradient vectors including the angles and the lengths of gradients of the pixel values of the surroundings of the feature point in the rotated image generated by the main direction adjusting unit 20 as pixel information. In this way, pixel information is unique information of each pixel such as the angle and the length of a gradient of the pixel value. The pixel information generating unit 30 may generate pixel information using at least one of a luminance value and color information (e.g., chrominance information Cr and Cb) of the rotated image generated by the main direction adjusting unit 20 as a pixel value. Also, the pixel information generating unit 30 may generate pixel information using a raw image which is an image output from an imaging device as the input image.

The feature point pixel information distribution generating unit 40 generates the distribution (first distribution) of pixel information of a region (first region) including the feature point. More specifically, the feature point pixel information distribution generating unit 40 generates the distribution of pixel information at the feature point based on pixel information in a sub-region including the feature point coordinates. For example, the feature point pixel information distribution generating unit 40 sets the gradient vectors, of pixels in the region including the feature point among the gradient vectors generated by the pixel information generating unit 30 as elements, and generates a histogram showing the distribution of cumulative totals of lengths with respect to angles as the first distribution.

The sub-feature point detecting unit 50 detects sub-feature points in the surroundings of the feature point. More specifically, the sub-feature point detecting unit 50 detects sub-feature points which are characteristic points other than the feature point within a predetermined range centering on the feature point in the rotated image generated by the main direction adjusting unit 20 and outputs the coordinates of the detected sub-feature points (referred to as feature point coordinates below). At this time, the sub-feature point detecting unit 50 sets points of which feature evaluation values are lower than the feature evaluation value of the feature point detected by the feature point detecting unit 10 as candidates for sub-feature points. Also, as the sub-feature points, the sub-feature point detecting unit 50 determines one point or a plurality of points of which feature evaluation values are higher than a predetermined value among the candidates for sub-feature points.

The sub-feature point pixel information distribution generating unit 60 generates the distributions (second distributions) of pixel information of regions (second regions) including the sub-feature points. More specifically, the sub-feature point pixel information distribution generating unit 60 generates the distribution of pixel information at each sub-feature point based on pixel information of a sub-region including sub-feature point coordinates. For example, the sub-feature point pixel information distribution generating unit 60 sets the gradient vectors of pixels in a region including a sub-feature point among the gradient vectors generated by the pixel information generating unit 30 as elements and generates a histogram showing the distribution of cumulative totals of lengths with respect to angles as a second distribution.

The feature amount generating unit 70 generates a feature amount at the feature point based on the distribution of pixel information of the feature point and the distributions of pixel information of the sub-feature points. More specifically, as the feature amount of the feature point, the feature amount generating unit 70 outputs a set in which elements of the distribution of pixel information of the feature point and the distributions of pixel information of the sub-feature points are combined. For example, as the feature amount of the feature point, the feature amount generating unit 70 outputs a set in which the distribution of pixel information of the feature point and a distribution obtained by arranging distributions of pixel information related to the respective plurality of sub-feature points in order based on the feature evaluation values of the plurality of sub-feature points are combined.

Figure 2:
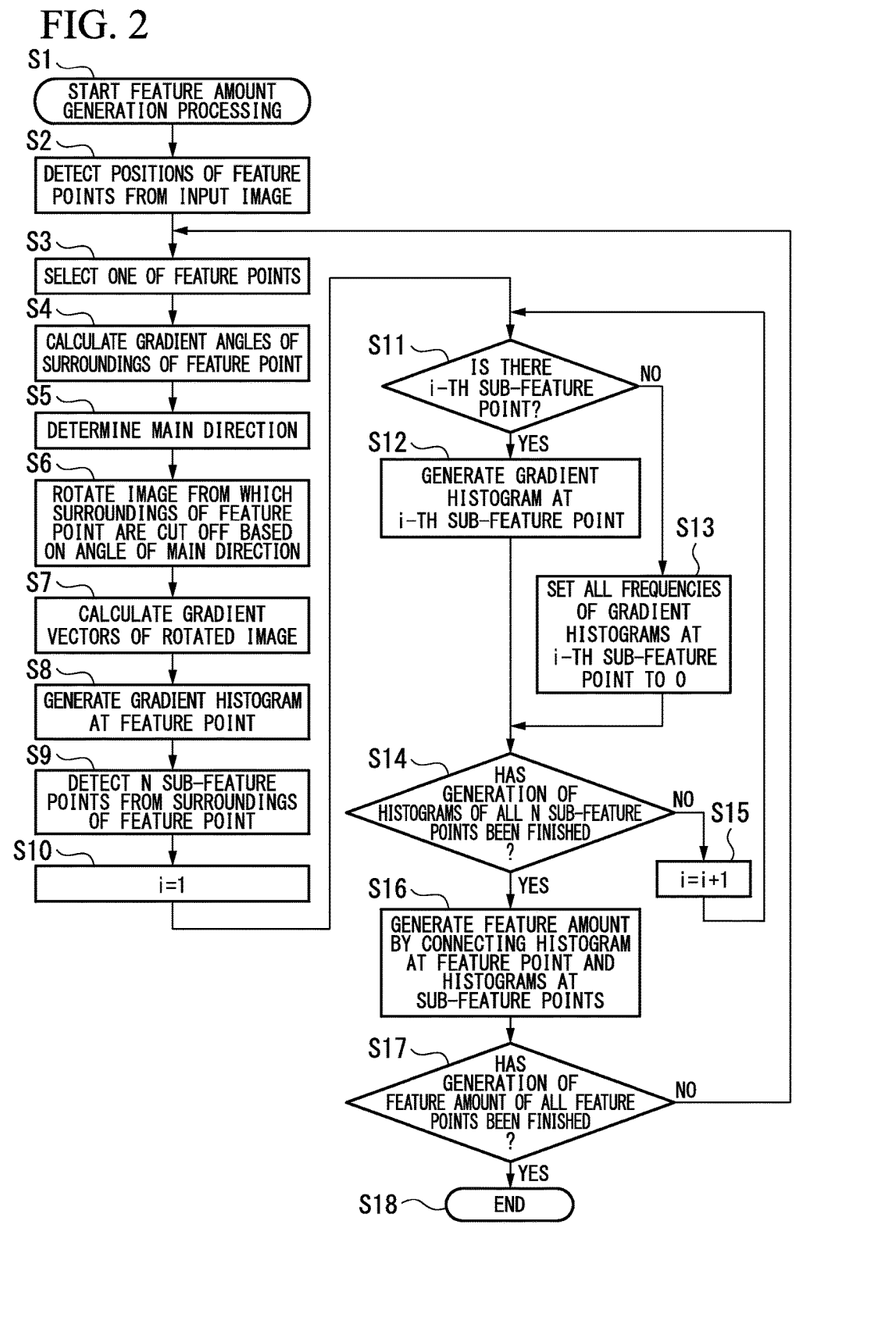
FIG. 2 is a flowchart illustrating a processing procedure of the feature amount generation device according to a find embodiment of the present invention.

Next, with reference to FIG. 2, feature amount generation processing by a feature amount generation device will be described in detail. FIG. 2 illustrates a procedure for feature amount generation processing. When the feature amount generation device is supplied with an input image and instructed to generate a feature amount, the feature amount generation device starts feature amount generation processing.

When processing is started in step S1, the feature point detecting unit 10 detects the position of feature points from the input image in step S2. For example, using a method of calculating a feature evaluation value (Harris Corner Detector or the like) which represents the strength of a feature, the feature point detecting unit 10 detects points of which feature evaluation values are equal to or larger than a predetermined threshold value or are within a predetermined number of feature evaluation values in decreasing order as feature points.

Subsequently, in step S3, the feature point detecting unit 10 selects one of the detected feature points and outputs the coordinates of the selected feature point (referred to as a noticeable feature point below) to the main direction adjusting unit 20 at a rear stage.

Subsequently, processing of finding the main direction of the noticeable feature point is performed. The main direction is a dominant angle which is most common among the gradient angles of pixels close to the noticeable feature point.

More specifically, in step S4, the main direction adjusting unit 20 calculates the gradient angles of luminance values with respect to a plurality of pixels close to the noticeable feature point. Here, data used to generate the gradient angles is not limited to luminance values but may be color information or pixel values of a raw image. A gradient angle θ(x, y) of a pixel at a coordinate position (x, y) is calculated by expression (1) below. In expression (1) luminance values of pixels adjacent to the pixel of the coordinate position (x, y) are represented as I(x−1, y), I(x+1, y), I(x, y−1), and I(x, y+1).

The reference direction of an angle is the upward direction (Y direction) of the image, and the angle increases counterclockwise.

[Equation 1]

$$\theta(x, y) = \tan^{-1}\left\{\frac{I(x, y+1) - I(x, y-1)}{I(x+1, y) - I(x-1, y)}\right\} \quad (1)$$

Subsequently, in step S5, the main direction adjusting unit 20 sets the gradient angles generated in step S4 as bins (the horizontal axis of a histogram), generates a histogram which has the number of gradient angles as a frequency (the vertical axis of the histogram) and determines a gradient angle of which a frequency is the maximum in the generated histogram as the main direction.

Subsequently, in step S6, the main direction adjusting unit 20 rotates the input image based on the main direction found in step S5. More specifically, the main direction adjusting unit 20 cuts off a region of a predetermined size centering on the noticeable feature point of the input image and rotates the cut-off region about the noticeable feature point by the angle of the main direction in the opposite direction of the angle of the main direction, thereby generating a rotated image. The main direction of the noticeable feature point in the rotated image after the rotation becomes the upward direction of the image. The main direction adjusting unit 20 outputs the rotated image to the pixel information generating unit 30 and the sub-feature point detecting unit 50 at rear stages. The size of the region cut off from an image is a size in which a region used to generate a distribution of pixel information at a rear stage is included.

For example, in this embodiment, the region which is cut off from the input image to generate the rotated image is a rectangular region of 32 pixels×32 pixels.

The main direction adjustment consisting of the processing of above steps S4 to S6 is performed so that the pixel information generating unit 30 at a rear stage can generate pixel information which is not changed by rotation of a subject. By rotating the image based on the angle of the main direction of the feature point, the main direction of the feature point after the fixation is directed in the same direction at all times regardless of rotation of the subject. The luminance gradient vector of a pixel value generated by the pixel information generating unit 30 at the rear stage is generated from the image which has been rotated according to the angle of the main direction, and thus the angle of the luminance gradient vector becomes an angle formed with respect to the main direction tan angle having the main direction as a reference direction). For this reason, even when the subject rotates, an angle constituting the luminance gradient vector indicates the same angle at all times in the case of the same subject. In this way; it is possible to reduce a change of a feature amount caused by rotation of the subject. Thus far, description has been made on the assumption of rotation of a subject. However, even when a device itself which captures an image is rotated, a main direction adjustment is performed according to the rotation in the same way as described above, and thus it is possible to reduce a change of a feature amount caused by the rotation of the device itself.

Subsequently, in step S7, the pixel information generating unit 30 generates luminance gradient vectors, which are the gradient vectors of luminance values of the rotated image generated in step S6, based on the luminance values. A length Norm (x, y) and an angle Gradient (x, y) of a luminance gradient vector of a coordinate position (x, y) are calculated by expression (2) and expression (3) below; respectively. In expression (2) and expression (3), the rotated image is represented as R, and the luminance values of adjacent pixels are represented as R(x−1, y), R(x+1, y), R(x, y−1), and R(x, y+1). Also, angles are quantized into multiples of 45 degrees and represented as eight angles of 0 degrees to 315 degrees at intervals of 45 degrees.

[Equation 2]

$$\text{Norm}(x, y) = \sqrt{(R(x, y+1) - R(x, y-1))^2 + (R(x+1, y) - R(x-1, y))^2} \quad (2)$$

$$\text{Gradient}(x, y) = \tan^{-1}\left\{\frac{-(R(x, y+1) - R(x, y-1))}{R(x+1, y) - R(x-1, y)}\right\} / (\pi/4) \quad (3)$$

Figure 3A:
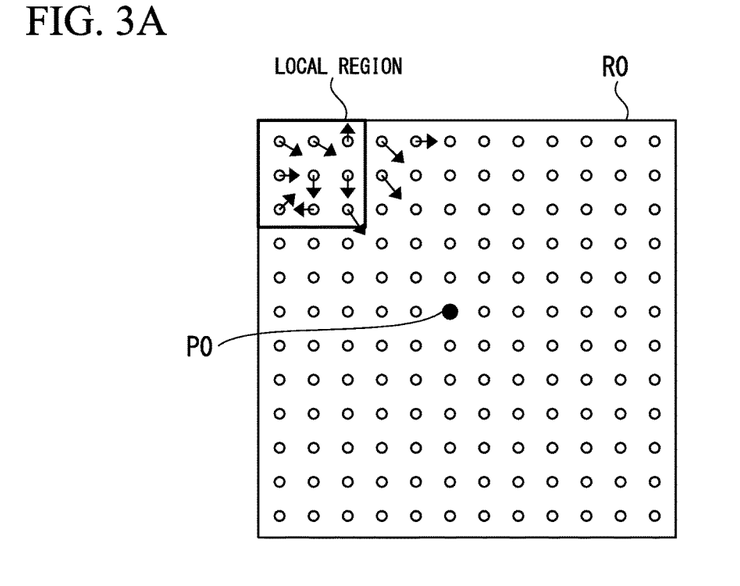
FIG. 3A is a reference diagram showing an example of sub-region in the first embodiment of the present invention.
Figure 3B:
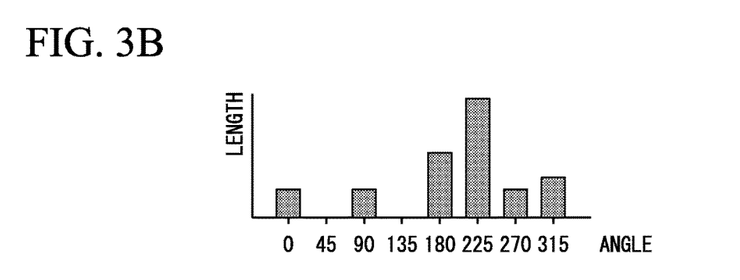
FIG. 3B is a reference diagram showing an example of a local histogram in the first embodiment of the present invention.
Figure 3C:
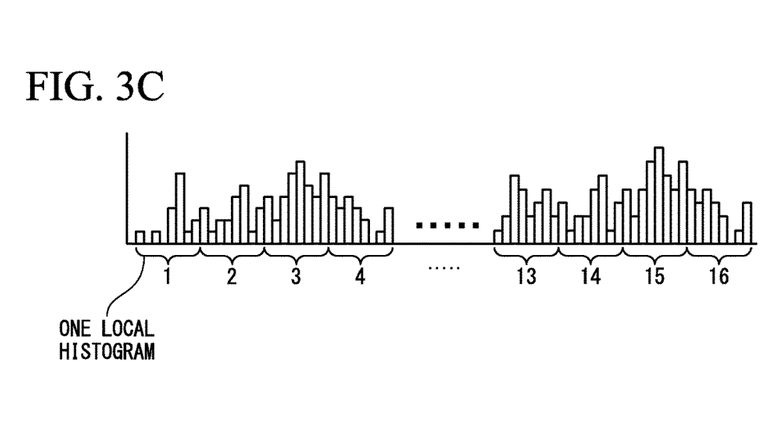
FIG. 3C is a reference diagram showing an example of a gradient histogram in the first embodiment of the present invention.

Subsequently, in step S8, the feature point pixel information distribution generating unit 40 generates a histogram which represents the distribution of luminance gradient vectors of a sub-region including the noticeable feature point (referred to as a gradient histogram below). It is preferable for the size of the sub-region to be a rather small size within a range in which the feature point can be recognized. From FIG. 3A to FIG. 3C show the concept of generating a gradient histogram in the present embodiment of the present invention. FIG. 3A shows an example of sub-region R0 from which a gradient histogram in the rotated image generated in step S6 is generated. Small circles in FIG. 3A represent pixels. In this embodiment, as shown in FIG. 3A by way of example, the sub-region R0 from which the gradient histogram is generated is a rectangular region of 12×12 pixels centering on a noticeable feature point P0. Also, in this embodiment, 16 regions of 3×'pixels obtained by partitioning the sub-region are defined as local regions.

One histogram (referred to as a local histogram below) is generated for every local region. The local histogram represents the cumulative total of lengths with respect to the angles of luminance gradient vectors in the local region. FIG. 3B shows an example of a local histogram which has been generated from the luminance gradient vectors of pixels in one local region. As shown in FIG. 3B, a bin of a local histogram is an angle, and the frequency is the cumulative total of the lengths of luminance gradient vectors. Since the angles of luminance gradient vectors are represented as the angles of eight directions, the number of bins of one local histogram is eight. When the lengths of a plurality of luminance gradient vectors correspond to the same angle, the frequency of the local histogram at the angle is the cumulative total (sum total) of the lengths of the plurality of luminance gradient vectors.

FIG. 3C shows an example of a gradient histogram. The feature point pixel information distribution generating unit 40 generates the local histogram regarding each of the 16 local regions and generates the gradient histogram of the noticeable feature point by connecting the generated 16 local histograms. The number of bins of one local histogram is eight, and thus, as shown in FIG. 3C, a histogram of 8×16=128 bins is the gradient histogram of the noticeable feature point. The gradient histogram of the noticeable feature point is completed with the above processing.

Subsequently, in step S9, the sub-feature point detecting unit 50 detects sub-feature points. The sub-feature points are characteristic points in the surroundings of the noticeable feature point, and a number N of sub-feature points is two in an example of this embodiment.

More specifically, the sub-feature point detecting unit 50 detects sub-feature points within a predetermined range centering on the noticeable feature point in the rotated image generated by the main direction adjusting unit 20. As a detection method, a feature evaluation value calculation method such as HarrisCornerDetector is used. The sub-feature point detecting unit 50 sets points of which calculated feature evaluation values are equal to or larger man a predetermined threshold value as candidates for sub-feature points and selects a point (one point or a plurality of points) of which a feature evaluation value ranks high among the candidates for sub-feature points as a sub-feature point.

The threshold value set at this time is, for example, a threshold value which is lower than the threshold value of a feature evaluation value used by the feature point detecting unit 10 in step S2 described above. In this way, even a point having a low feature evaluation value may be a sub-feature point. This is because, when the threshold value is too high to detect a sub-feature point, the dimensions of a final feature amount becomes small, and it is difficult to obtain a characteristic of the feature point. However, when the threshold value is not designated or is too low, many points have similar feature evaluation values, and when the feature amount of the same feature point in a different image is calculated, there is a high chance of a different sub-feature point being selected and the feature amount becoming unstable. Therefore, it is preferable to provide a threshold value of a predetermined value or more. In the example of this embodiment, there are two sub-feature points, and the sub-feature points are given numbers of 1 and 2 in decreasing order of feature evaluation values.

Subsequently, in step S10, a control unit which is not shown in the drawings initializes a number i of a sub-feature point which in subjected to processing. In other words, the value of the number i is set to 1.

Subsequently, in step S11, the control unit which is not shown in the drawings determines whether or not there is an i-th sub-feature point. When there is an i-th sub-feature point, the processing proceeds to step S12.

In step S12, the sub-feature point pixel information distribution generating unit 60 generates the gradient histogram of the i-th sub-feature point using the luminance gradient vectors generated by the pixel intimation generating unit 30. Generation of the gradient histogram is performed on a sub-region centering on the coordinates of the i-th sub-feature point by the same method as the method of generating a gradient histogram hi step S8 described above.

Figure 4:
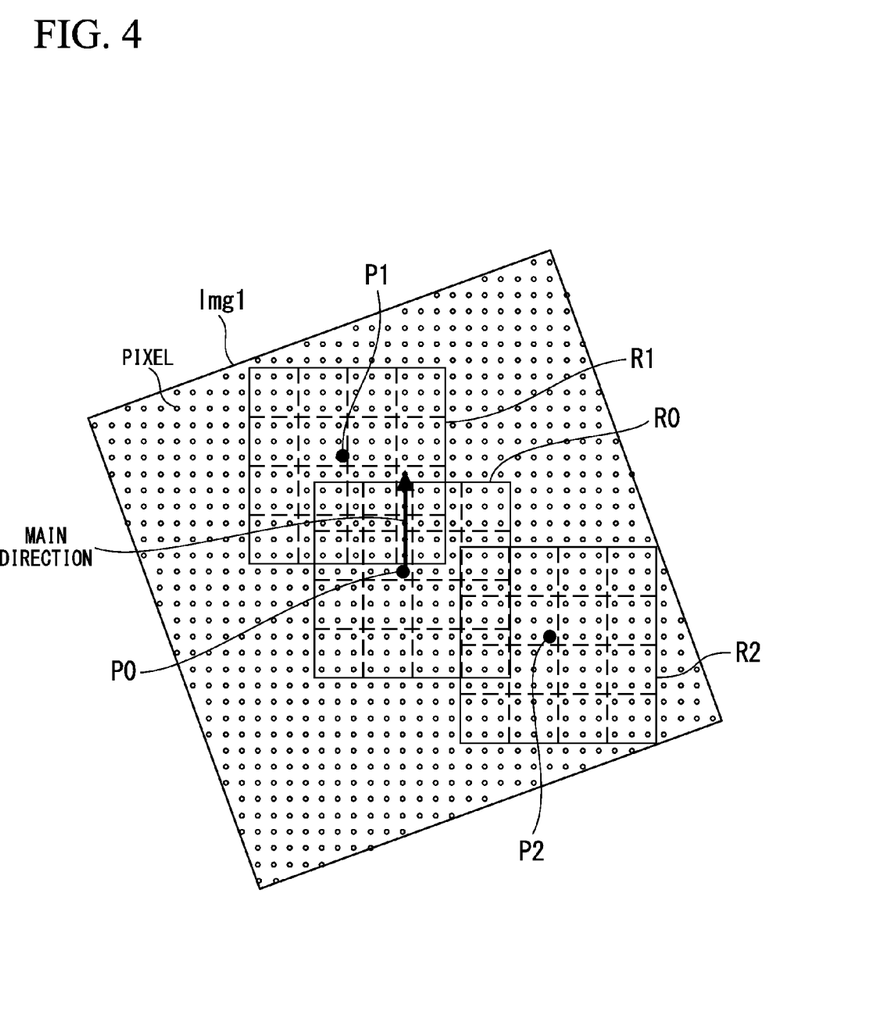
FIG. 4 is a reference diagram showing a noticeable feature point and sub-feature points in the first embodiment of the present invention.

FIG. 4 shows examples of a noticeable feature point and sub-feature points on a totaled image. Small circles in FIG. 4 represent pixels. A noticeable feature point P0 is set at the center of a rotated image Img1, and two sub-feature points P1 and P2 are set in the surroundings of the noticeable feature point P0. A rectangular region of 12×12 pixels including the noticeable feature point P0 is a sub-region R0 which is used to generate a gradient histogram. Likewise, respective rectangular regions of 12×12 pixels including the sub-feature points P1 and P2 are sub-regions R1 and R2 which are used to generate gradient histograms. 16 regions which are obtained by partitioning each of the sub-regions R0, R1, and R2 and indicated by dashed lines are local regions. In step S12, a gradient histogram of luminance gradient vectors of a sub-region including the sub-feature point is generated for each of the sub-feature points, like the noticeable feature point.

In step S11, when there is no point of which a feature evaluation value is equal to or larger than the threshold value within a range in which detection of a sub-feature point has been performed and there is no i-th sub-feature point, the processing proceeds to step S13. In step S13, the sub-feature point pixel information distribution generating unit 60 generates a gradient histogram of which all frequencies are 0. Alternatively, without generating the gradient histogram of a sub-feature point which does not exist, the gradient histogram of the feature point generated in step S8 may be set as the final feature amount of the noticeable feature point. Alter the gradient histogram of the i-th sub-feature point is completed, the processing proceeds to step S14.

In step S14, the control unit which is not shown in the drawings determines whether or not processing of all the sub-feature points has been finished. When the processing of the sub-feature points has not been finished, the processing proceeds to step S15. In step S15, the control unit which is not shown in we drawings performs an increment (by 1) of the number i of the sub-feature point which is subjected to processing After that, the processing returns to step S11, and generation processing of the gradient histogram of a next sub-feature point is performed. When the processing of all the sub-feature points has been finished, the processing proceeds to step S16.

In step S16, the feature amount generating unit 70 arranges the gradient histogram of the noticeable feature point and the gradient histograms of the two sub-feature points and connects them to generate a histogram of 128× 3=384 bins. At this time, for example, the gradient histograms of the two sub-feature points are arranged behind the gradient histogram of the noticeable feature point. Also, the gradient histograms of the sub-feature points are arranged in order based on, for example, the feature evaluation values of the sub-feature points (e.g., in decreasing order of feature evaluation value).

Even when the feature amount of the same feature point is generated from a different image, it is easy to arrange histograms in the same order by arranging the histograms in decreasing order of feature evaluation value, and thus the feature amount is stabilized.

The histogram of 384 bins generated by the above method becomes the feature amount of the noticeable feature point, and the feature amount generation processing of one feature point is completed. Subsequently, in step S17, the control unit which is not shown in the drawings determines whether or not the processing of steps S3 to S16 has been performed on all the feature points. When there is a feature point which has not been subjected to the processing of steps S3 to S16, the processing returns to step S3, and the processing of steps S3 to S16 has been performed on the next feature point. When the processing of all the feature points is completed, the feature amount generation processing is finished in step S18.

In the above example, two sub-feature points are detected. However, only one sub-feature point may be detected, or three or more sub-feature points may be detected.

As described above, one feature amount is obtained by combining a plurality of feature amounts which have been generated using data of small ranges, and thus even when there is a change in the surroundings of a noticeable feature point, it is possible to suppress the amount of change of the feature amount.

Functions of the respective blocks constituting the feature amount generation device according to this embodiment may be implemented as functions of software when a computer (central processing unit (CPU)) of the feature amount generation device reads and executes, for example, a program stored in a read only memory (ROM) which is not shown in the drawings. This program may be provided by a "computer-readable recording medium," for example, a flash memory. Also, the aforementioned program may be input to the feature amount generation device from a computer which has stored this program in a memory device or the like through a transmission medium, or by being transmitted to the feature amount generation device by transmission waves among transmission media. Here, a "transmission medium" which transmits the program is a medium having the function of transmitting information, such as a network (communication network) which is the Internet or the like or a communication circuit (communication line) which is a telephone circuit or the like. Also, the aforementioned program may implement some of the above-described functions. In addition, the aforementioned program may be a so-called difference file (difference program) capable of implementing the above-described functions in combination with a program which has already been recorded in a computer.

Figure 5:
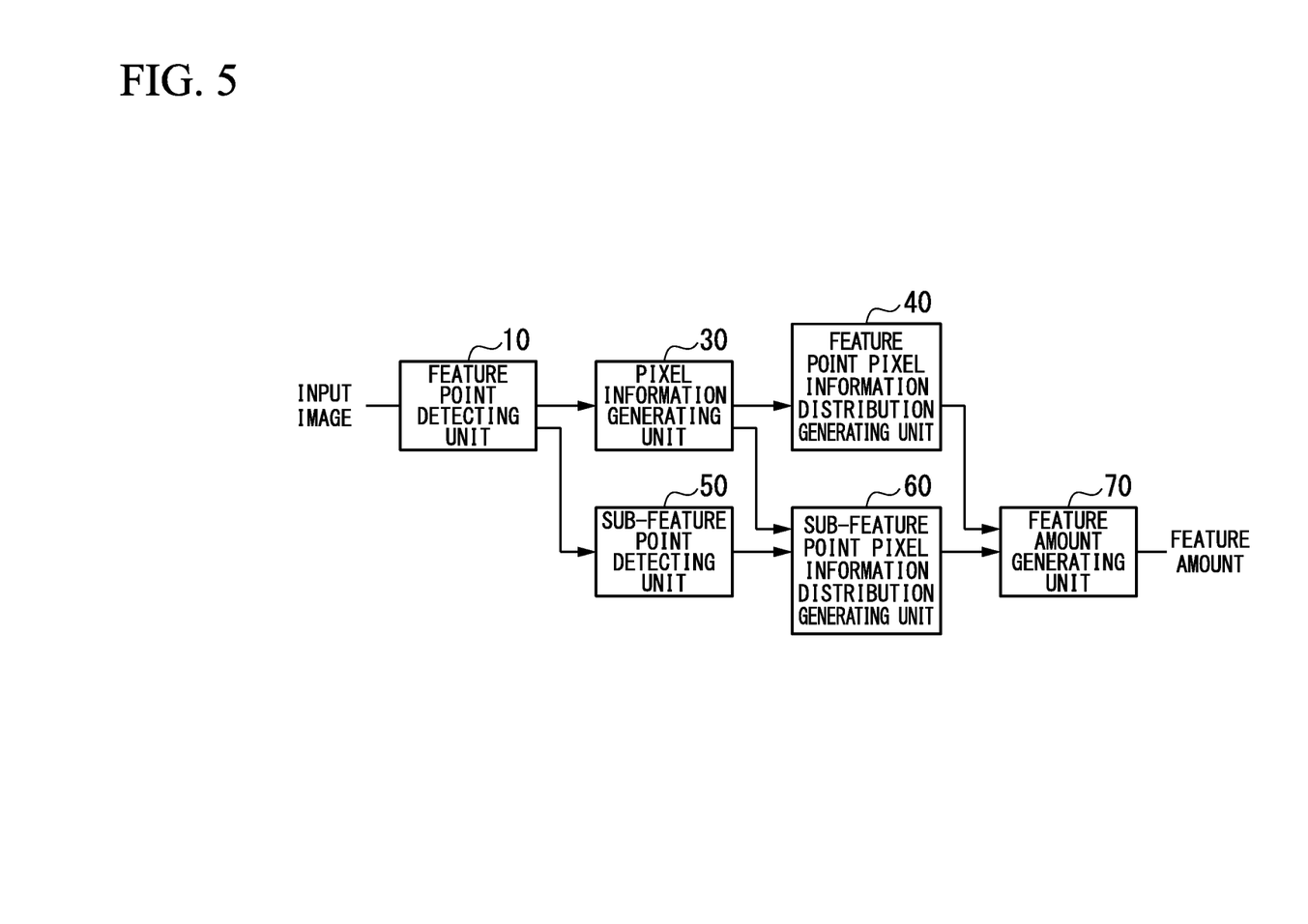
FIG. 5 is a block diagram showing a configuration of a feature amount generation device according to the first embodiment of the present invention.

In the above description, the feature amount generation device includes the main direction adjusting unit 20, but the feature amount generation device may not include the main direction adjusting unit 20. FIG. 5 shows a configuration of a variation of the feature amount generation device according to this embodiment. The feature amount generation device shown in FIG. 5 includes a feature point detecting unit 10, a pixel information generating unit 30, a feature point pixel information distribution generating unit 40, a sub-feature point detecting unit 50, a sub-feature point pixel information distribution generating unit 60, and a feature amount generating unit 70.

The coordinates of a feature point (feature point coordinates) detected by the feature point detecting unit 10 are output to the pixel information generating unit 30 and the sub-feature point detecting unit 50. The pixel information generating unit 30 generates pixel information from pixel values of the surroundings of the feature point in an input image. The sub-feature point detecting unit 50 detects sub-feature points from the surroundings of the feature point in the input image. Processing performed by the feature amount generation device shown in FIG. 5 is the same as processing performed by the feature amount generation device shown in FIG. 1 except dtat the pixel information generating unit 30 and the sub-feature point detecting unit 50 perform processing not on a rotated image but on the input image.

Figure 6:
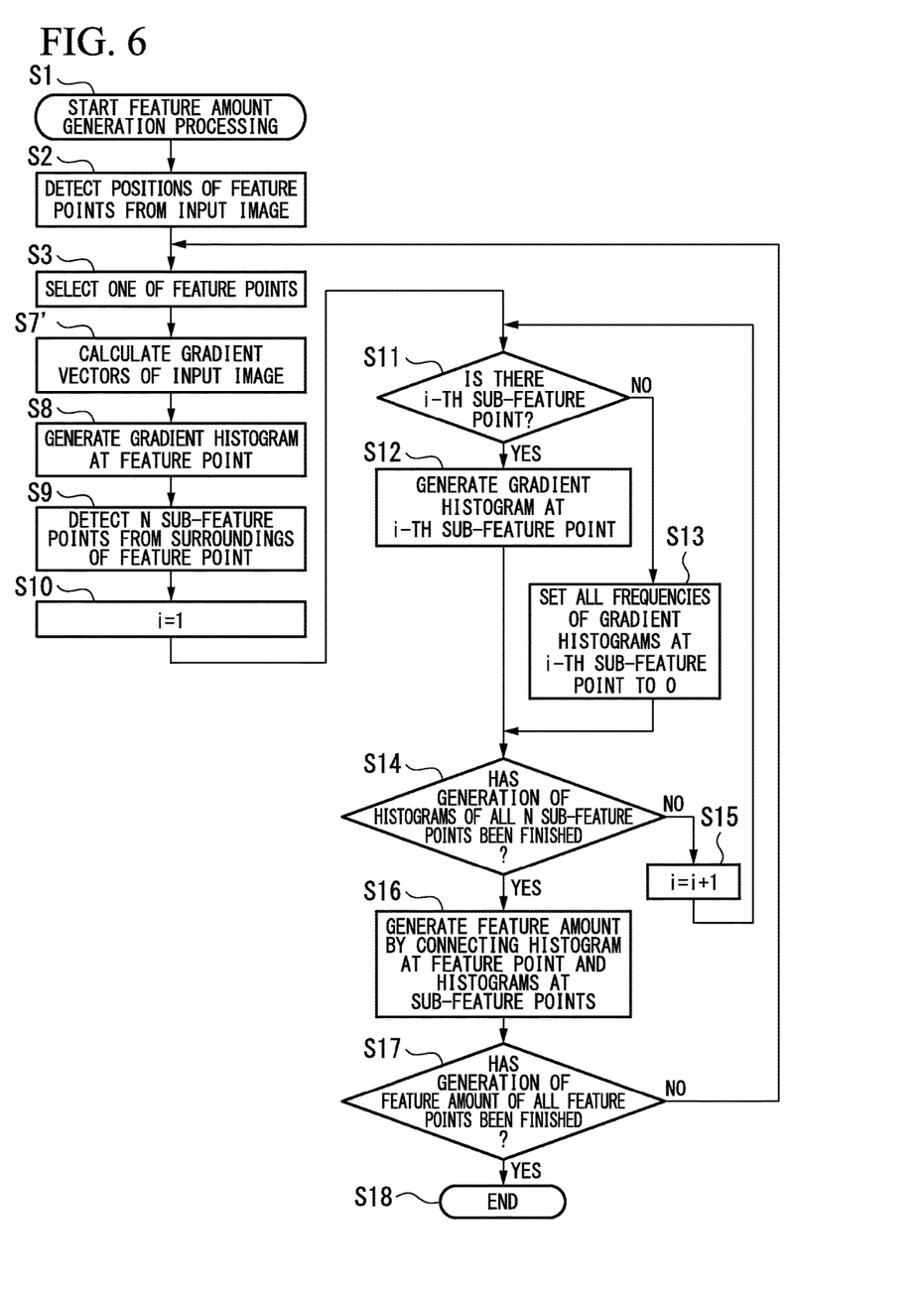
FIG. 6 is a flowchart illustrating a processing procedure of the feature amount generation device according to the first embodiment of the present invention.

FIG. 6 illustrates a procedure of feature amount generation processing performed by the feature amount generation device shown in FIG. 5. In the processing shown in FIG. 2, the processing of steps S4 to S6 is removed, and the processing of step S7 is changed to the processing of step S7. In the processing shown in FIG. 6, a feature point is selected in step S3, and then the pixel information generating unit 30 generates luminance gradient vectors from luminance values of an input image in Step S7. Other than this, the processing of FIG. 6 is the same as the processing of FIG. 2.

The feature amount generation device shown in FIG. 5 does not perform processing of reducing a change of a feature amount caused by rotation of a subject or rotation of the device itself (the processing of steps S4 to S6 of FIG. 2), but can generate a feature amount which is hardly affected by movement of the subject or movement of surroundings in an image other than rotation.

As described above, according to this embodiment, it is possible to generate a robust feature amount which is hardly affected by movement of a subject or movement of surroundings in an image by generating the feature amount at a feature point based on the gradient histogram of the feature point, which is the distribution (first distribution) of pixel information of a sub-region (first region) including the feature point, and the gradient histograms of sub-feature points, which are the distributions (second distributions) of pixel information of sub-regions (second regions) including the sub-feature points.

Also, by setting points of which feature evaluation values are lower than the feature evaluation value of a feature point as candidates for sub-feature points, it becomes possible to detect a sub-feature point even in a region having few strong feature points, and thus a reduction in feature amount information can be prevented.

Also, by determining one point or a plurality of points of which feature evaluation points are higher than a predetermined value as sub-feature points among candidates for sub-feature points, stronger sub-feature points are selected, and thus the individuality of a final feature amount becomes strong. For this reason, when the feature amounts of the same feature point are generated in different images, there is a high chance of detecting the same sub-feature point, and the stability of the feature amount is improved.

Also, even when the positional relation of a sub-feature point between different images is changed, by setting a set in which the gradient histogram of a feature point and an arrangement of gradient histograms related to a respective plurality of sub-feature points in order based on the feature evaluation values of the plurality of sub-feature points are combined as a feature amount at the feature point, the order of gradient histograms at the feature point remains the same as long as the same point is photographed. For this reason, it is possible to generate a feature amount which is robust against movement of surroundings.

Also, by generating gradient vectors including the angles and the lengths of gradients of pixel values in the surroundings of a feature point in an input image as pixel information, it is possible to generate a feature amount which is robust against a change in illumination.

Also, by regarding the gradient vectors of pixels in a sub-region centering on a sub-feature point among gradient vectors generated by the pixel information generating unit 30 as elements, a gradient histogram showing the distribution of cumulative totals of lengths with respect to angles is generated, and thus it is possible to generate a feature amount including information on the sub-feature point which is robust against a change in illumination.

Also, by regarding the gradient vectors of pixels in a region centering on a feature point among gradient vectors generated by the pixel information generating unit 30 as elements, a histogram showing the distribution of cumulative totals of lengths with respect to angles is generated, and thus it is possible to generate a feature amount including information on the feature point which is robust against a change in illumination.

Also, using only luminance information is a pixel value when generating pixel information, it is possible to generate, with a small amount of data, a feature amount reflecting the characteristic of a feature point of which brightness varies even when a color remains the same. Further, using only color information as a pixel value at the time of generating pixel information, it is possible to generate, with a small amount of data, a feature amount reflecting the characteristic of a feature point of which a color changes even when luminance remains the same. Moreover, using only luminance information and color information as pixel values at the lime of generating pixel information, it is possible to generate a feature amount in which both the color information and the luminance information are taken into consideration.

Also, using a raw image as an input image, pixel information is generated, and thus it is possible to search for a set in which both the color information and the luminance information are taken into consideration with a small amount of data.

Also, the main direction of a feature point is calculated based on the gradient angles of the pixel values of respective pixels in the surroundings of the feature point in an input image, and the input image is rotated according to the main direction. Therefore, it is possible to generate a feature amount which is robust against rotation of a subject and rotation of the device itself.

(Second Embodiment)

Next, a second embodiment of the present invention will be described. A configuration of a feature amount generation device according to this embodiment is the same as the configuration of the feature amount generation device shown in FIG. 1. In this embodiment, the number and the size of local regions when gradient histograms are generated are variable.

For example, the sub-feature point pixel information distribution generating unit 60 determines the number of partitions of a sub-region centering on a sub-feature point according to the number of sub-feature points detected by the sub-feature point detecting unit 50, partitions the sub-region so that the number of regions after the partition becomes the determined number of partitions, and generates a gradient histogram of the sub-feature point for every local region after the partition. Alternatively, the sub-feature point pixel information distribution generating unit 60 determines the partition size of a sub-region centering on a sub-feature point according to the number of sub-feature points detected by the sub-feature point detecting unit 50, partitions the sub-region so that the size of regions after the partition becomes the determined partition size, and generates a gradient histogram for every local region after the partition.

The feature point pixel information distribution generating unit 40 determines the number of partitions of a sub-region centering on a feature point according to the number of partitions determined by the sub-feature point pixel information distribution generating unit 60. More specifically, the feature point pixel information distribution generating unit 40 determines the number of partitions of a sub-region centering on the feature point to be the same as the number of partitions determined by the sub-feature point pixel information distribution generating unit 60.

Alternatively, the feature point pixel information distribution generating unit 40 determines the partition size of a sub-region centering on the feature point according to the partition size of a sub-region determined by the sub-feature point pixel information distribution generating unit 60. More specifically, the feature point pixel information distribution generating unit 40 determines the partition size of the sub-region centering on the feature point to be the same as the partition size determined by the sub-feature point pixel information distribution generating unit 60.

Figure 7:
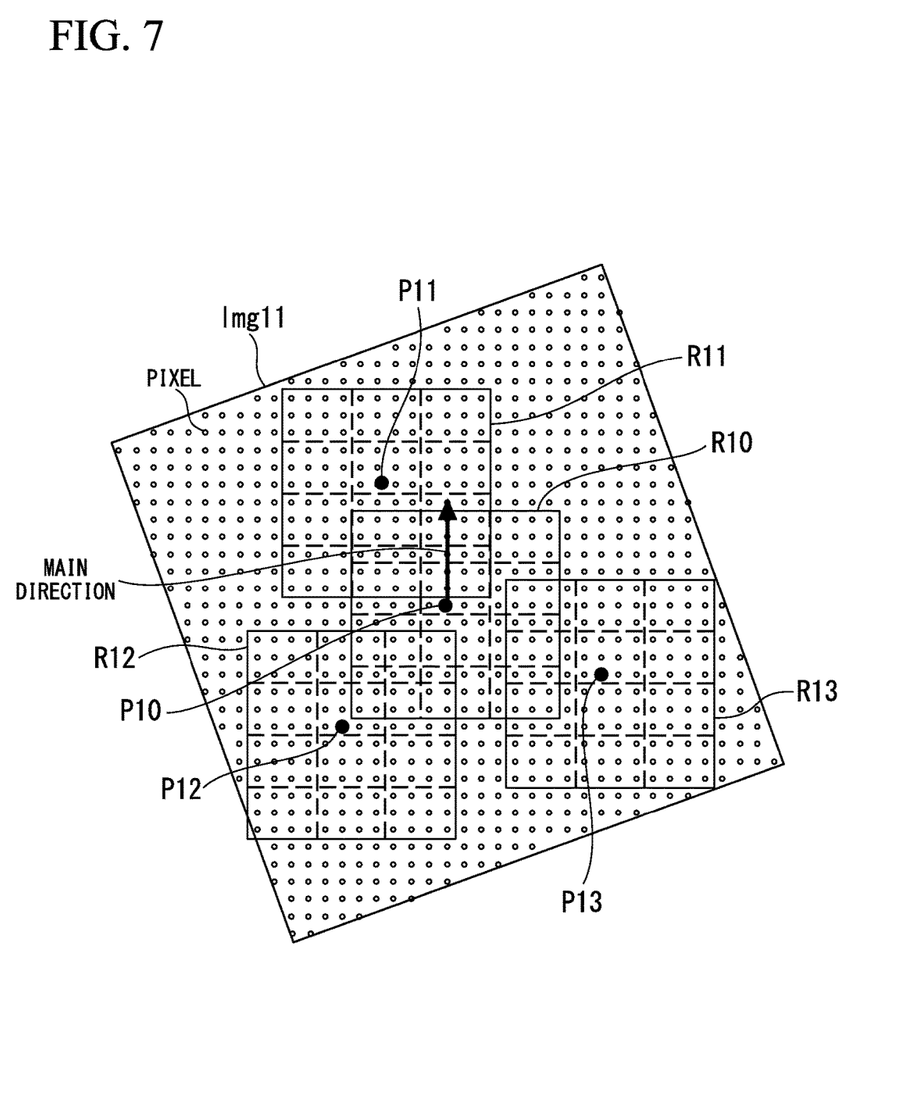
FIG. 7 is a reference diagram showing local regions when the number of local regions is changed according to the number of sub-feature points in a second embodiment of the present invention.

FIG. 7 shows examples of local regions when the number of local regions is changed according to the number of sub-feature points. Small circles in FIG. 7 represent pixels. A noticeable feature point P10 is set at the center of a rotated image Img11, and three sub-feature points P11, P12, and P13 are set in the surroundings of the noticeable feature point P10. A rectangular region of 12×12 pixels including the noticeable feature point P10 is a sub-region R10 which is used to generate a gradient histogram. Likewise, respective rectangular regions of 12×12 pixels including the sub-feature points P11, P12, and P13 are sub-regions R11, R12, and R13 which are used to generate gradient histograms. 12 regions which are obtained by partitioning each of the sub-regions R10, R11, R12, and R13 and indicated by dashed lines are local regions.

When the number of sub-feature points is three and the number of local regions is 12, if the number of bins of one local histogram is eight, the number of bins of one gradient histogram becomes 12×8=96. Since it is necessary for the number of bins to be an amount for the total of four points which are the three sun-feature points and the one noticeable feature point, dimensions of the final feature amount of the noticeable feature point become 96×4=384. For this reason, even when the number of sub-feature points is increased from two in the first embodiment, it is possible to suppress the dimensions of a feature amount to be the same as the dimensions of the feature amount in the first embodiment. The dimensions of a feature amount is in proportion to the production of the total number of a noticeable feature point and sub-feature points and the number of local regions, and thus even when the number of sub-feature points increases, it is possible to suppress an increase in the dimensions of a feature amount by reducing the number of local regions.

In a memory of the feature amount generation device which is not shown in the drawings, information relating to the size of sub-regions (sub-regions R10, R11, R12, and R13 of FIG. 7), information relating to the dimensions of a feature amount, and information relating to the number of bins of one local histogram are stored. The sub-feature point pixel information distribution generating unit 60 determines the number of local regions according to the number of sub-feature points detected by the sub-feature point detecting unit 50, the size (12×12 pixels) of a sub-region, the dimensions (384 dimensions) of a feature amount, and the number (eight) of bins of one local histogram. For example, when the number of sub-feature points is two, the number of bins of a total of three points which are the two sub-feature points and one noticeable feature point becomes 384÷3=128. Since the number of bins of one local histogram is 8, the number of local regions becomes 128÷8=16. Also, when the number of sub-feature points is three, the number of bins of a total of four points which are the three sub-feature points and one noticeable feature point becomes 384÷4=96. Since the number of bins of one local histogram is 8, the number of local regions becomes 96÷8=12.

Figure 8:
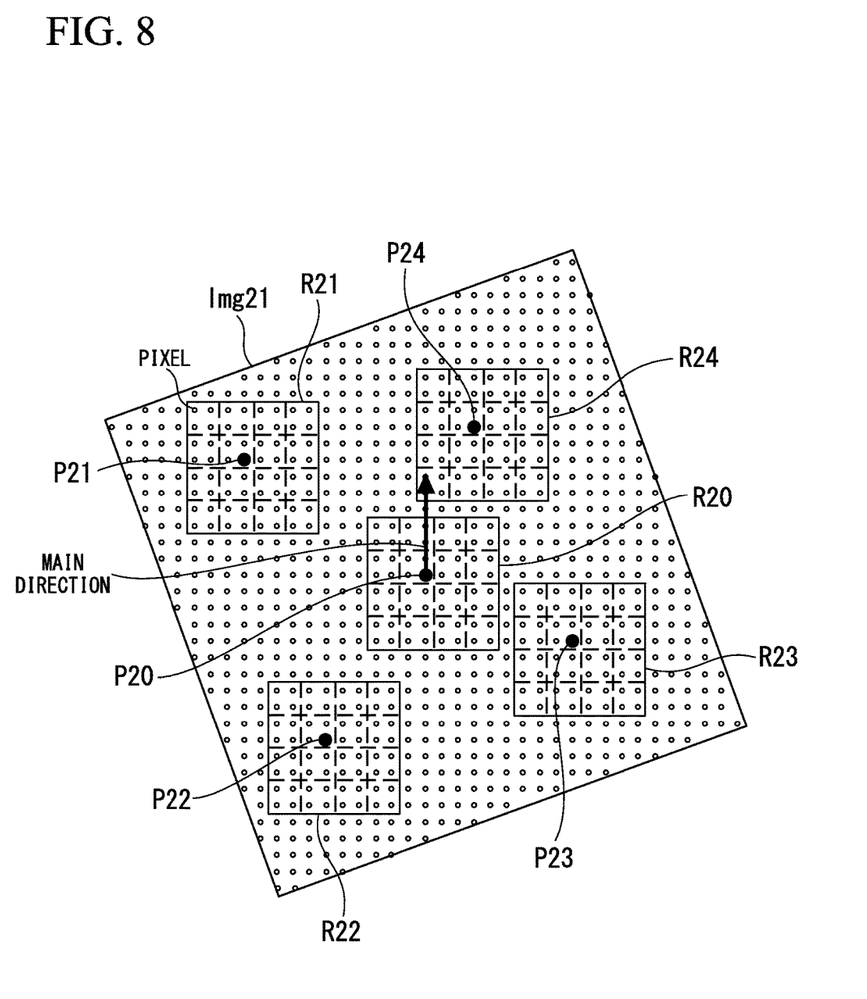
FIG. 8 is a reference diagram showing local regions when the size of local regions is changed according to the number of sub-feature points in the second embodiment of the present invention.

FIG. 8 shows examples of local regions when the size of local regions is changed according to the number of sub-feature points. Small circles, in FIG. 8 represent pixels. A noticeable feature point P20 is set at the center of a rotated image Img21, and four sub-feature points P21, P22, P23, and P24 are set in the surroundings of the noticeable feature point P20. A rectangular region of 8×8 pixels including the noticeable feature point P20 is a sub-region R20 which is used to generate a gradient histogram. Likewise, rectangular regions of 8×8 pixels including the sub-feature points P21, P22, P23, and P24 are sub-regions R21, R22, R23, and R24 which are used to generate gradient histograms. 16 regions which are obtained by partitioning each of the sub-regions R20, R21, R22, R23, and R24 and indicated by dashed lines are local regions.

When the number of sub-feature points is five and the size of local regions is 2×2=4 pixels, the number of pixels from which data used so as to generate a feature amount is obtained becomes 4×16×5=320. In the first embodiment (FIG. 4), the number of pixels is 9×16×3=432. For this reason, compared to the first embodiment it is possible to reduce the number of pixels from which data used so as to generate a feature amount is obtained. Like this, by changing the size of local regions according to the number of sub-feature points, it is possible to generate a feature amount in which the number of sub-feature points has been increased without increasing the amount of computation or the amount of data transmission for generating the feature amount.

In a memory of the feature amount generation device which is not shown in the drawings, information relating to the number (16) of local regions in sub-regions (the sub-regions R20, R21, R22, R23, and R24 of FIG. 8) is stored. The sub-feature point pixel information distribution generating unit 60 determines the size of local regions according to information relating to the number of sub-feature points detected by the sub-feature point detecting unit 50 and the number (16) of local regions in a sub-region. When the number of sub-feature point is two, the size of local regions becomes, for example, 12×12 pixels. In this case, the number of pixels becomes 432 as mentioned above. Also, when the number of sub-feature points is five, the size of local regions is determined with respect to the live sub-feature points and the 16 local regions so that the number of pixels docs not exceed 432. As a result, the size of local regions becomes, for example, 2×2=4 pixels.

As described above, in this embodiment, the number of partitions of a sub-region centering on a sub-feature point is determined according to the number of sub-feature points, the sub-region is partitioned so that the number of regions alter the partition becomes the determined number of partitions, and a gradient histogram of the sub-feature point is generated for every local region after the partition, so that the dimensions of a feature amount can be kept at a fixed number. For this reason, without changing the usage of a storage region or processing time, it is possible to generate a feature amount suited for an image.

Also, the partition size of a sub-region centering on a sub-feature point is determined according to the number of sub-feature points, the sub-region is partitioned so that the size of regions after the partition becomes the determined partition size, and a gradient histogram of the sub-feature point is generated for every local region after the partition, so that, even when the number of sub-feature points is increased, a feature amount can be generated without increasing the amount of computation for generating the feature amount.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A feature amount generation device comprising:
a feature point detecting unit configured to detect a feature point from an input image;
a pixel information generating unit configured to generate pixel information from pixel values of surroundings of the feature point in the input image;
a feature point pixel information distribution generating unit configured to generate a first distribution of pixel information of a first region including the feature point;
a sub-feature point detecting unit configured to detect sub-feature points which are feature points in the surroundings of the feature point;
a sub-feature point pixel information distribution generating unit configured to generate second distributions of pixel information of second regions including the sub-feature points; and
a feature amount generating unit configured to generate a feature amount at the feature point based on the first distribution and the second distributions,
wherein the sub-feature point pixel information distribution generating unit sets points of which feature evaluation values are lower than a feature evaluation value of the feature point detected by the feature point detecting unit as candidates for the sub-feature points.

2. The feature amount generation device according to claim 1,
wherein the sub-feature point pixel information distribution generating unit determines a number of partitions of the second regions according to a number of the sub-feature points detected by the sub-feature point detecting unit, partitions the second regions so that a number of regions after the partition becomes the determined number of partitions, and generates a second distribution for every region after the partition.

3. The feature amount generation device according to claim 1,
wherein the sub-feature point pixel information distribution generating unit determines a partition size of the second regions according to a number of the sub-feature points detected by the sub-feature point detecting unit, partitions the second regions so that a size of regions after the partition becomes the determined partition size, and generates a second distribution for every region after the partition.

4. The feature amount generation device according to claim 1,
wherein the sub-feature point detecting unit determines one point or a plurality of points of which feature evaluation values are higher than a predetermined value among the candidates for the sub-feature points as the sub-feature points.

5. The feature amount generation device according to claim 1,
wherein the feature amount generating unit sets, as a feature amount at the feature point, a set in which the first distribution and a distribution obtained by arranging the second distributions related to the plurality of sub-feature points in order based on feature evaluation values of the plurality of sub-feature points are combined.

6. The feature amount generation device according to claim 1,
wherein the pixel information generating unit generates gradient vectors including angles and lengths of gradients of the pixel values of the surroundings of the feature point in the input image as the pixel information.

7. The feature amount generation device according to claim 6,
wherein the sub-feature point pixel information distribution generating unit generates histograms showing distributions of cumulative totals of lengths with respect to angles as the second distributions by regarding gradient vectors of pixels of the second regions among the gradient vectors generated by the pixel information generating unit as elements.

8. The feature amount generation device according to claim 7,
wherein the feature point pixel information distribution generating unit generates a histogram showing a distribution of cumulative totals of lengths with respect to angles as the first distribution by regarding gradient vectors of pixels of the first region among the gradient vectors generated by the pixel information generating unit as elements.

9. The feature amount generation device according to claim 1,
wherein the pixel information generating unit generates the pixel information using at least one of luminance values and color information of the input image as the pixel values.

10. The feature amount generation device according to claim 1,
wherein the pixel information generating unit generates the pixel information using a raw image as the input image.

11. The feature amount generation device according to claim 1, further comprising
a main direction adjusting unit configured to calculate a main direction of the feature point based on gradient angles of the pixel values of respective pixels in the surroundings of the feature point in the input image, and rotates the input image according to the main direction, wherein the pixel information generating unit generates pixel information from pixel values of surroundings of the feature point in the input image rotated by the main direction adjusting unit.

12. A feature amount generation method comprising:
a step of detecting a feature point from an input image;
a step of generating pixel information from pixel values of surroundings of the feature point in the input image;
a step of generating a first distribution of pixel information of a first region including the feature point;
a step of detecting sub-feature points which are feature points in the surroundings of the feature point;
a step of generating second distributions of pixel information of second regions including the sub-feature points;
a step of setting points of which feature evaluation values are lower than a feature evaluation value of the feature point detected in the step of detecting the feature point from the input image as candidates for the sub-feature points; and
a step of generating a feature amount at the feature point based on the first distribution and the second distributions.

13. A non-transitory medium saving a program for causing a computer to perform:
a step of detecting a feature point from an input image;
a step of generating pixel information from pixel values of surroundings of the feature point in the input image;
a step of generating a first distribution of pixel information of a first region including the feature point;
a step of detecting sub-feature points which are feature points in the surroundings of the feature point;
a step of generating second distributions of pixel information of second regions including the sub-feature points;
a step of setting points of which feature evaluation values are lower than a feature evaluation value of the feature point detected in the step of detecting the feature point from the input image as candidates for the sub-feature points; and
a step of generating a feature amount at the feature point based on the first distribution and the second distributions.

* * * * *